United States Patent
Anderson et al.

(10) Patent No.: US 6,235,187 B1
(45) Date of Patent: *May 22, 2001

(54) OXYGEN SEPARATION METHOD USING A MIXED CONDUCTING CUBIC PEROVSKITE CERAMIC ION TRANSPORT MEMBRANE

(75) Inventors: Harlan U. Anderson, Rolla, MO (US); Vincent Sprenkle, Davenport, IA (US); Ingeborg Kaus, Ann Arbor, MI (US); Chieh-Cheng Chen, Getzville, NY (US)

(73) Assignee: Praxair Technology Inc., Danbury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,610

(22) Filed: Feb. 2, 1999

Related U.S. Application Data

(63) Continuation of application No. 08/775,683, filed on Dec. 31, 1996, now Pat. No. 5,911,860.

(51) Int. Cl.[7] .................................................. C25C 1/10
(52) U.S. Cl. ................................... 205/634; 95/45; 95/54
(58) Field of Search .................................. 501/123, 126, 501/132, 152; 252/519.1, 520.5, 521.1; 429/30, 33, 46; 204/295, 421; 96/11–14; 95/45, 54; 502/302, 305, 313, 314, 316, 319; 205/634

(56) References Cited

U.S. PATENT DOCUMENTS

| | | | |
|---|---|---|---|
| 5,648,304 | 7/1997 | Mazanec et al. | 501/134 |
| 5,712,220 | 1/1998 | Carolan et al. | 502/400 |
| 5,817,597 | 10/1998 | Carolan et al. | 502/400 |
| 5,911,860 | * 6/1999 | Chen et al. | 204/295 |

FOREIGN PATENT DOCUMENTS 778069    6/1997   (EP) .
61-21717  1/1986   (JP) .

OTHER PUBLICATIONS

Kim et al., Oxygen Permeation, Electrical Conductivity and Stability of the Perovskite Oxide $La_{0.2}Sr_{0.8}Cu_{0.4}Co_{0.6}O_{3-x}$, Solid State Ionics vol. 104, (1997) pp. 57–65.

Teraoka et al., "Effect of Cation Substitution on the Oxygen Semipermeability of Perovskite–type Oxides", Chemistry Letters (1988) pp. 503–506.

Genouel et al., "On the Cubic Perovskites $La_{0.2}Sr_{0.8}Cu_{0.4}M_{0.6}O_{3-y}$(M=Co,Fe)", Journal Solid State Chemistry 119 (1995) pp. 260–270.

* cited by examiner

*Primary Examiner*—Bruce F. Bell
(74) *Attorney, Agent, or Firm*—David M. Rosenblum

(57) ABSTRACT

A ceramic membrane element for an oxygen separator is formed from a ceramic material represented by the structure:

$$A_{1-x}A'_xB_{1-y}B'_yO_{3-z}$$

where
- A is a lanthanide element;
- A' is a suitable lanthanide element dopant;
- B is selected from the group consisting of titanium, vanadium, chromium, manganese, iron, cobalt, nickel, zinc and mixtures thereof;
- B' is copper;
- x is between 0.4 and 0.8;
- y is between 0.1 and 0.9; and
- z is>0 (and determined by stoichiometry).
- When B includes cobalt in an amount greater than 0.1, the included iron content is less than 0.05.

The membrane element selectively transports oxygen ions therethrough at a relatively low temperature, with a flux detected at about 600° C. This enables the oxygen separator to be operated at lower temperatures than convention separators that frequently have operating temperatures in excess of 900° C. Mechanical stability may be enhanced by the addition of a second phase to the ceramic.

10 Claims, 2 Drawing Sheets

OXYGEN SEPARATION METHOD USING A MIXED CONDUCTING CUBIC PEROVSKITE CERAMIC ION TRANSPORT MEMBRANE

CROSS REFERENCE TO RELATED APPLICATION

This patent application is a continuation in part of U.S. patent application Ser. No. 08/775,683 entitled "Solid Electrolyte Membrane with Mechanically-Enhancing Constituents" that was filed on Dec. 31, 1996 now U.S. Pat. No. 5,911,860. U.S. Pat. No. 5,911,860 is incorporated by reference in its entirety herein.

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

This invention relates to an oxygen separation method using ceramic compositions useful as solid electrolyte ion transport membranes. More particularly, the invention relates to a perovskite structure that contains the oxides of two lanthanides and two transition metals. The composition is oxygen deficient and maintains a cubic structure over a wide temperature range.

BACKGROUND OF THE INVENTION

The separation of oxygen from an oxygen containing gaseous stream is a process step in a number of commercially significant manufacturing operations. One method of oxygen separation utilizes a mixed conductor ceramic material. Oxygen ions and electrons are selectively transported through the non-porous ceramic membrane element that is impervious to other species. Suitable ceramics include mixed conductor perovskites and dual phase metal—metal oxide combinations. Exemplary ceramic compositions are disclosed in U.S. Pat. Nos. 5,702,959 (Mazanec, et al.), 5,712,220 (Carolan, et al.) and 5,733,435 (Prasad, et al.), all of which are incorporated by reference in their entireties herein.

The membrane elements have oxygen selectivity. "Oxygen selectivity" means that only oxygen ions are transported across the membrane with the exclusion of other elements, and ions thereof. The solid electrolyte membrane is made from inorganic oxides, typified by calcium- or yttrium-stabilized zirconium or analogous oxides having a fluorite or perovskite structure. Use of these membranes in gas purification applications is described in European Patent Application No. 778,069 entitled "Reactive Purge for Solid Electrolyte Membrane Gas Separation" by Prasad, et al.

The ceramic membrane element has the ability to transport oxygen ions and electrons at the prevailing oxygen partial pressure in a temperature range of from 450° C. to about 1200° C. when a chemical potential difference is maintained across the membrane element. This chemical potential difference is established by maintaining a positive ratio of oxygen partial pressures across the ion transport membrane. The oxygen partial pressure ($P_{O_2}$) is maintained at a higher value on the cathode side of the membrane, that is exposed to the oxygen-containing gas, than on the anode side, where transported oxygen is recovered. This positive $P_{O_2}$ ratio may be obtained by reacting transported oxygen with an oxygen-consuming process or fuel gas. The oxygen ion conductivity of a mixed conductor perovskite ceramic membrane is typically in the range of between 0.01 and 100 S/cm where S ("Siemens") is reciprocal of ohms ($1/\Omega$).

For effective application of a perovskite for oxygen separation, a number of requirements should be met. The perovskite should have a high oxygen flux, where flux is the rate of oxygen transport through the membrane structure. The perovskite must have a cubic crystalline structure over the entire range of operating temperatures. Perovskites with a hexagonal crystalline structure are not effective for oxygen transport. Some perovskites have a hexagonal crystalline structure at room temperature (nominally 20° C.) and undergo a phase transformation at an elevated temperature. In such a material, the phase transformation temperature represents the minimum temperature at which an oxygen separator containing that material as a membrane element may be operated. The perovskite structure must be chemically stable at the operating temperature and have a degree of mechanical stability.

A number of mixed oxide perovskites are disclosed as useful for oxygen separation. These perovskites are typically of the form $ABO_3$ where A is a lanthanide element, B is a transition metal and O is oxygen. A lanthanide, or rare earth element, is an element between atomic number 57 (lanthanum) and atomic number 71 (lutetium) in the Periodic Table of the Elements as specified by IUPAC. Typically, yttrium (atomic number 39) is included within the lanthanide group. The transition metals are those in Period 4, and between Groups II and III, of the Periodic Table of the Elements and include titanium, vanadium, chromium, manganese, iron, cobalt, nickel, copper and zinc. The A component and/or the B component may be doped with other materials to enhance stability and performance.

U.S. Pat. No. 5,648,304 by Mazanec, et al. discloses an oxygen selective perovskite represented by the formula

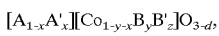

where

- A is selected from the group consisting of calcium, strontium and barium;
- A' is selected from the lanthanide series defined as elements 57–71 on the Periodic Table of Elements as well as yttrium, thorium and uranium;
- B is selected from the group consisting of iron, manganese, chromium, vanadium and titanium;
- B' is selected to be copper or nickel;
- x is in the range of between about 0.0001 and 0.1;
- y is in the range of from about 0.002 and 0.05;
- z is in the range of from about 0.0005 and 0.3;

and d is determined by the valence of the metals.

Mazenac et al. disclose that the addition of a relatively low concentration of specific transition metals stabilizes the perovskite as a cubic structure inhibiting the formation of hexagonal phase materials. The crystalline structure is disclosed as stable over a temperature range of 25° C. to 950° C.

U.S. Pat. No. 5,712,220 by Carolan, et al. discloses a perovskite effective for solid state oxygen separation devices represented by the structure

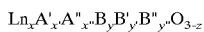

where
- Ln is an element selected from the f block lanthanides;
- A' is selected from Group 2;
- A" is selected from Groups 1, 2, and 3 and the f block lanthanides;
- B, B' and B" and independently selected from the d block transition metals, excluding titanium and chromium;
- $0<x<1$;
- $0<x'<1$;
- $0<x"<1$
- $0<y<1.1$;
- $0<y'<1.1$;
- $0<y"<1.1$;
- $x+x'+x"=1.0$;
- $1.1>y+y'+y">1.0$; and
- z is a number which renders the compound charge neutral where the elements are represented according to the Periodic Table of the Elements as adopted by IUPAC.

The structure disclosed by Carolen et al. has a B (transition metal) ratio $(y+y'+y"/x+x'+x")$ that is greater than 1. The structure is disclosed as having stability in an environment having high carbon dioxide and water vapor partial pressures.

U.S. Pat. No. 5,817,597 by Carolan et al. discloses a perovskite effective for solid state oxygen separation devices represented by the structure

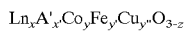

$$Ln_xA'_{x'}Co_yFe_{y'}Cu_{y"}O_{3-z}$$

Where
- Ln is an element selected from the f block lanthanides;
- A' is either strontium or calcium;
- x, y and z are greater than 0;
- $x+x'=1$
- $y+y'+y"=1$;
- $0<y"<0.4$; and
- z is a number that renders the composition of matter charge neutral. The composition is disclosed as having a favorable balance of oxygen permeance and resistance to degradation under high oxygen partial pressure conditions. The B-site is stabilized by a combination on iron and copper.

Another perovskite structure suitable for use as an oxygen transport membrane is disclosed in Japanese Patent Office Kokai No. 61-21,717 that was published on Jan. 30, 1986. The Kokai discloses a metal oxide for oxygen transport membrane represented by the structure:

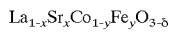

$$La_{1-x}Sr_xCo_{1-y}Fe_yO_{3-\delta}$$

where
- x is between 0.1 and 1;
- y is between 0.05 and 1; and
- δ is between 0.5 and 0.

A paper by Teraoka (*Chemistry Letters,* A publication of the Chemical Society of Japan, 1988) discloses a perovskite structure suitable for use as an oxygen transport membrane and discusses the effect of cation substitution on the oxygen permeability. One disclosed composition is $La_{0.6}Sr_{0.4}Co_{0.8}B'_{0.2}O_3$ where B' is selected from the group consisting of manganese, iron, nickel, copper, cobalt and chromium.

In another field of endeavor, perovskites have been found to have superconductivity, the capacity to conduct electrons with virtually no electrical resistance, at temperatures approaching the boiling point of liquid nitrogen. The *Journal of Solid State Chemistry* published an article by Genouel, et al. in 1995 disclosing an oxygen deficient perovskite represented by the structure:

$$La_{0.2}Sr_{0.8}Cu_{0.4}M_{0.6}O_{3-y}$$

where
- M is selected from the group consisting of cobalt and iron; and
- y is between 0.3 and 0.58.

Genouel et al. disclose that the crystalline structure had a large concentration of randomly distributed oxygen vacancies, (y) was as large as 0.52 rather than the stoichiometrically predicted 0. The reference disclosed that the high electrical conductivity is related to the presence of mixed valence copper (Cu(II)/Cu(III)) and reported electrical conductivity over the range of $1000/T=3$ $(k^{-1})$ to $1000/T=10(k^-1)$. This temperature range, 60° C. to –173° C., is representative of the onset of superconductivity for high temperature superconductors.

When the perovskites disclosed above are used as membranes in an oxygen separator, the separator is typically operated at a temperature of between about 900° C. and 1100° C. to achieve a high oxygen flux. Operating at such high temperatures is detrimental to the stability of the membrane as well as the other components of the reactor.

There is a need, therefore, for perovskite structures effective in separation of oxygen from an oxygen containing gaseous stream at a relatively high oxygen flux at temperatures below 900° C., where the materials also have mechanical stability.

OBJECTS OF THE INVENTION

It is a first object of the invention to provide a ceramic material that is suitable for use as a membrane element in oxygen separators. The ceramic material has a cubic perovskite crystalline structure and a detectable oxygen flux at temperatures as low as 600° C.

A second object of the invention is to provide the ceramic material with enhanced mechanical stability to avoid cracking under stress. Such stresses may be imposed due to temperature differences between different portions of the membrane element as well as due to a higher concentration of oxygen on the cathode side of the membrane than on the anode side during start-up.

SUMMARY OF THE INVENTION

In accordance with a first aspect of the invention, a ceramic membrane element for an oxygen separation device consists essentially of a substantially cubic perovskite structure. The structure is substantially stable in air over a temperature range of 25° to 950° C. The structure is of the form:

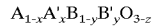

$$A_{1-x}A'_xB_{1-y}B'_yO_{3-z}$$

where
- A is a lanthanide element;
- A' is a suitable lanthanide element dopant;
- B is selected from the group consisting of titanium, vanadium, chromium, manganese, iron, cobalt, nickel and zinc and mixtures thereof, with the proviso that if cobalt is present in an amount of greater than 0.1, the iron content is less than 0.05;

B' is copper;

x is between 0.4 and 0.8;

y is between 0.1 and 0.9; and z is>0 and determined from stoichiometry.

In preferred embodiments of the first aspect, A is lanthanum, A' is strontium and B is cobalt. X is between 0.6 and 0.8, y is between 0.1 and 0.3 and z is between 0.1 and 0.5.

In accordance with a second aspect of the invention, the membrane element further includes a second phase, C, that increases mechanical stability. In this second aspect, structure is of the form:

$$A_{1-x}A'_xB_{1-y}B'_yO_{3-z}+C$$

where

C is selected from the group consisting of silver, palladium, platinum, gold, rhodium, ruthenium, tungsten, tantalum, high temperature alloys, praseodymium-indium oxide mixture, niobium-titanium oxide mixture, nickel oxide, tungsten oxide, tantalum oxide, ceria, zirconia, magnesia, and alloys or mixtures thereof.

In a preferred embodiment of this second aspect, C is an alloy of Ag and Pd that constitutes from 3% to 50% by weight of the composition. The Ag/Pd alloy, further, contains, by weight, from 10% to 95% palladium.

BRIEF DESCRIPTION OF THE DRAWINGS

Other objects, features and advantages will occur to those skilled in the art from the following description of preferred embodiments and accompanying drawings in which.

DETAILED DESCRIPTION OF THE INVENTION

Figure 1:
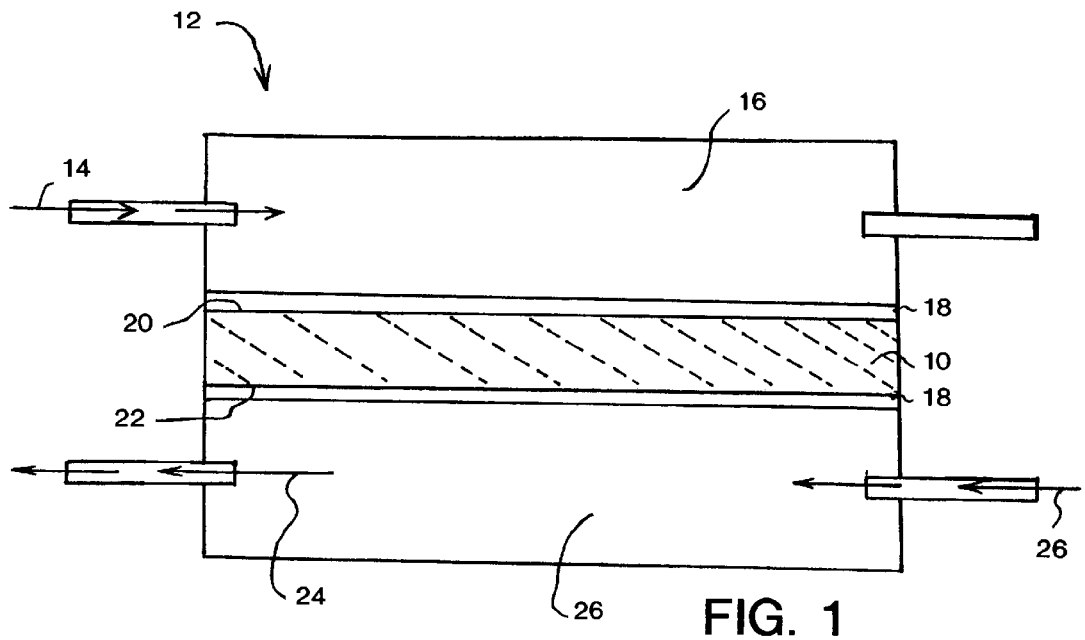
FIG. 1 illustrates in cross-sectional representation an oxygen separator utilizing a membrane element formed in accordance with the invention.

The compositions of the invention are mixed ionic ceramics that are capable of the selective transport of oxygen and electrons. With reference to FIG. 1, the ceramic composition is formed into a membrane element 10 that is a portion of an oxygen separation device 12. An oxygen containing feed gas 14, such as air, is introduced to a first side 16 of the oxygen separation device 12. A porous catalyst 18, such as sintered nickel or cobalt, coats one or both sides of the membrane element 10. Oxygen contained within the feed gas 14 is adsorbed into the porous catalyst 18 and dissociates at the cathode side surface 20 of the membrane element 10. Oxygen ions are transported through the membrane element 10 from the cathode side surface 20 to the anode side surface 22. At the anode side surface 22, the oxygen ions recombine to form oxygen releasing an electron in the process. This electron is transferred through the membrane element 10 from the anode side surface 22 to the cathode side surface 20. The recombined oxygen molecules desorb from the porous catalyst 18 on the anode side surface 22 and are recovered as a product gas 24 from the second side 26 of the oxygen separation device 12. The product gas 24 may be either unreacted molecules of oxygen or the product of an oxidation reaction with a process or fuel gas 26.

In a first embodiment of the invention, the membrane element 10 is a ceramic composition that has a substantially cubic perovskite structure which is stable in air over the temperature range of 25° C. to 950° C. The membrane element 10 is of the ABO type and contains specific dopants.

The composition is represented by the structure $$A_{1-x}A'_xB_{1-y}B'_yO_{3-z}$$

where

A is a lanthanide element and is preferably lanthanum;

A' is a suitable dopant and is preferably strontium;

B is selected from the group titanium, vanadium, chromium, manganese, iron, cobalt, nickel, zinc and mixtures thereof;

B' is copper;

x ranges between 0.4 and 0.8;

y ranges between 0.1 and 0.9; and since the composition is oxygen-deficient, z is greater than 0 (determined from stoichiometry).

When B includes cobalt in an amount greater than 0.1, the included iron content is less than 0.05 because the increase of iron substitution will decrease the oxygen ion conductivity of the membrane. Preferably, iron is present in no more than impurity levels.

In a preferred aspect of the invention, x is between 0.6 and 0.8, y is between 0.1 and 0.3 and z is between 0.1 and 0.5.

A most preferred composition is $$La_{0.2}Sr_{0.8}Co_{0.9}Cu_{0.1}O_{3-z}$$

While the compositions of the invention may be obtained by any suitable process, a modified Pechini (liquid mix) method is particularly suitable.

Carbonates of lanthanum and strontium were dissolved in 40 ml of $HNO_3$ in a 2,000 ml beaker. Mild heating (up to about 50° C.) and stirring are useful to facilitate dissolution. Nitrate solutions of copper and cobalt were then added to the solution. Approximately 20 ml of distilled water were added in the process to rinse all traces of reactants into the reaction vessel. 0.3 moles of citric acid and 0.3 moles of ethylene glycol were added as complexing agents. Each batch formed 0.2 moles of the desired ceramic material. The amounts and molecular weights of the various components are specified in Table 1.

TABLE 1

Amounts of Various Reactants
Used in the Synthesis of $La_{0.2}Sr_{0.8}Co_{0.9}Cu_{0.1}O_{3-z}$

| Formula | Molecular Weight (g/mol) | Moles Added | Grams Added |
|---|---|---|---|
| $La_2(CO_3)_3$ | 457.85 | 0.02 | 9.1570 |
| $SrCO_3$ | 147.63 | 0.16 | 23.6208 |
| Cu-nitrate | 1352.15 | 0.02 | 27.0429 |
| Co-nitrate | 506.731 | 0.18 | 91.2116 |

The solution was then heated to a temperature below boiling, typically about 90° C., until nitrous gases began to develop. The solution was then poured into a heated porcelain dish and dried in a drying oven at about 180° C. for a minimum of three hours. This resulted in a rigid foam that was crushed to a powder and milled in a vibratory mill in an ethanol medium for 24 hours using zirconium dioxide as the medium. The process and temperatures are as in Table 2.

TABLE 2

Temperature Processing of Samples

| Purpose of process | Heating rate (° C./min) | Hold temperature (° C.) | Hold time (hours) |
|---|---|---|---|
| Remove organics | 0.5 | 300 | 1 |
| Calcination | 2 | 700 | 4 |
| Sintering | 2 | 1030 | 2* |

*Also held for 1 hour at 300° C. on heating and cooling.

Following calcination, the powders were dry milled for four hours in a vibratory mill. The powders were then combined with a 4 weight % solution of polyvinyl alcohol and water, for use as a binder, for pellet pressing, adding 0.8 grams of the polyvinyl alcohol solution to 10 grams of powder. The powders and binder were then milled for a short time in a Spex mill (manufactured by Spex Industries, Inc. of Edison, N.Y.) with poly methyl methacrylate media to disperse solution in the powders.

Pellets were then uniaxially pressed using a stainless steel die with a diameter of 1.5 inches. For each pellet, 9 grams of powder were used and the applied pressure was 2,830 psi. The pellets were then isostatically pressed with a pressure of 40,000 psi and sintered in an oxygen atmosphere. This resulted in pellet samples having a density of about 95% of the theoretical density.

While the ceramic material of the first embodiment has many of the desirable attributes for the ceramic membrane structure 10 for the oxygen separation device 12, it is brittle and prone to fracture. The practical applications of the ceramic membranes are limited due to a possibility of structural fracture of the ceramic during thermal cycling. The mechanical properties of the ceramic membrane are enhanced by the addition of a ductile metal, as a second phase, into the ceramic that constitutes membrane element 10.

A high rate of oxygen flux is required, so the addition of metal is in an amount less than the percolation limit. The percolation limit is defined herein as a theoretical calculation of the amount of metallic powder that must be combined with the ceramic powders to form metallic passageways extending from the cathode side surface 20 to the anode side surface 22. In general, this requires the metallic second phase to be present in an amount of greater than 30%, by volume, to form a continuous second phase. However, such metallic passageways are not a desired element of the present invention.

Any electrically conductive, ductile metal that has a melting temperature above the processing temperature of the ceramic may be utilized as the second phase. The second phase is preferably selected from the group silver, palladium, platinum, gold, rhodium, ruthenium, tungsten, tantalum, high temperature alloys, such as inconel, hastelloy, monel and ducrolloy and mixtures thereof. More preferred second phase metals include silver, a silver palladium alloy and high temperature alloys. Most preferred are an alloy of silver and palladium wherein the alloy constitutes from about 3% to about 50%, by weight, of the entire composition. More preferably, the silver/palladium alloy constitutes from about 3% to about 20%, by weight, of the entire composition.

One preferred silver/palladium alloy contains between 10% and 95%, by weight, silver. Most preferably, the silver content of the alloy is between about 50% and about 95%.

Alternatively, the second phase may be selected to be a ceramic such as praseodymium-indium oxide mixture, niobium-titanium oxide mixture, nickel oxide, tungsten oxide, tantalum oxide, ceria, zirconia, magnesia, and mixtures thereof. Preferred second phase ceramics are those that may be introduced to the composition as an oxide and then subsequently reduced to a metal by heating in a reducing atmosphere. Exemplary of the preferred second phase ceramics are titanium oxide and nickel oxide.

In accordance with the second embodiment, the composition of the membrane element is represented by the structure $$A_{1-x}A'_xB_{1-y}B'_yO_{3-z}+C$$

where the parameters imposed on A, A' B, B', x, y and z are as in embodiment 1 and C is selected from the group consisting of silver, palladium, platinum, gold, rhodium, ruthenium, tungsten, tantalum, silver, a silver/palladium alloy, high temperature alloys, praseodymium-indium oxide mixture, niobium-titanium oxide mixture, nickel oxide, tungsten oxide, tantalum oxide, ceria, zirconia, magnesia, and alloys or mixtures thereof.

One exemplary composition is $$La_{0.2}Sr_{0.8}Co_{0.9}Cu_{0.1}O_{3-z}+20 \text{ weight \% of 90\% Ag/10\% Pd}$$

While this composition may be formed by any suitable method, an exemplary process is a modified liquid mix process in which thermogravimetrically standardized carbonates and nitrate solutions of the constituent ions are heated with citric acid and ethylene glycol and water.

As one process, 9.1570 grams of $La_2(CO_3)_3$ and 23.6208 grams $SrCO_3$ were added to a 2,000 ml beaker. Approximately 20 ml of distilled water were added to the carbonates followed by about 30 ml of nitric acid to dissolve the carbonates. The resulting solution was heated to about 90° C. and stirred to effect dissolution. Once the carbonates were dissolved, 28.7875 grams of a copper nitrate solution (1439.38 grams solution per mole $Cu^{2+}$) and 91.2116 grams of a cobalt nitrate solution were added to the beaker. 57.6 grams of citric acid and 18.6 grams of ethylene glycol were then added and the solution maintained at 90° C. and stirred. The precursor solution was held at 90° C. until all nitrous gases were evolved from the solution at which time the solution was placed in a pre-heated ceramic dish heated to 180° C. and retained at temperature for 12 hours to form a semi-rigid polymer char.

The char was then milled in ethanol for eight hours and the ethanol evaporated prior to calcination. Calcination was conducted as a two-step process. The milled char was first heated to 300° C. at a rate of 0.4° C. per minute during which combustion of some organics occurred followed by a 1.7° C. per minute ramp rate to 700° C. and a four hour hold time at 700° C. to insure phase formation.

The composite composition of perovskite plus alloy was prepared by mixing 8.0 grams of the yield ceramic and 2.0 grams of alloy with 0.5 grams of a binder (5 weight % polyvinyl alcohol in water) in a mortar and pestle.

Approximately 0.5 grams of the powdered composite was uniaxially pressed in a 0.5 inch diameter die at 5,000 lbs. of pressure. The samples were placed on a bed of precoarsened $La_{0.2}Sr_{0.8}Co_{0.9}Cu_{0.1}O_{3-z}$ on top of an aluminum oxide setter plate and heated to the sintering temperature at a rate of 3° C. per minute. The materials were then sintered at temperatures of between 940° C. and 1000° C. for a hold time of 4.0 hours in air.

Heating to 940° C. for sintering achieved a density of 6.37 g/cm³ with 2.17% of open pores. Increasing the sintering temperature to 960° C. increased the density to 6.39 g/cm³ and reduced the open porosity to 0.7%. Increasing the sintering temperature to 980° C. achieved the density of 6.42 g/cm³ with open porosity at 0.6%. However, once the sintering temperature was increased to 1,000° C., metal began to leach from the pre-coarsened ceramic bed and the resulting density decreased to 6.31 g/cm³ while the open porosity decreased to 0.2%.

As noted above, sintering should be conducted at a temperature below the temperature at which molten metal leaching occurs.

The benefits of the ceramic materials of the invention for use as a membrane element for an oxygen separator will become more apparent from the examples that follow:

EXAMPLES

Example 1

Figure 2:
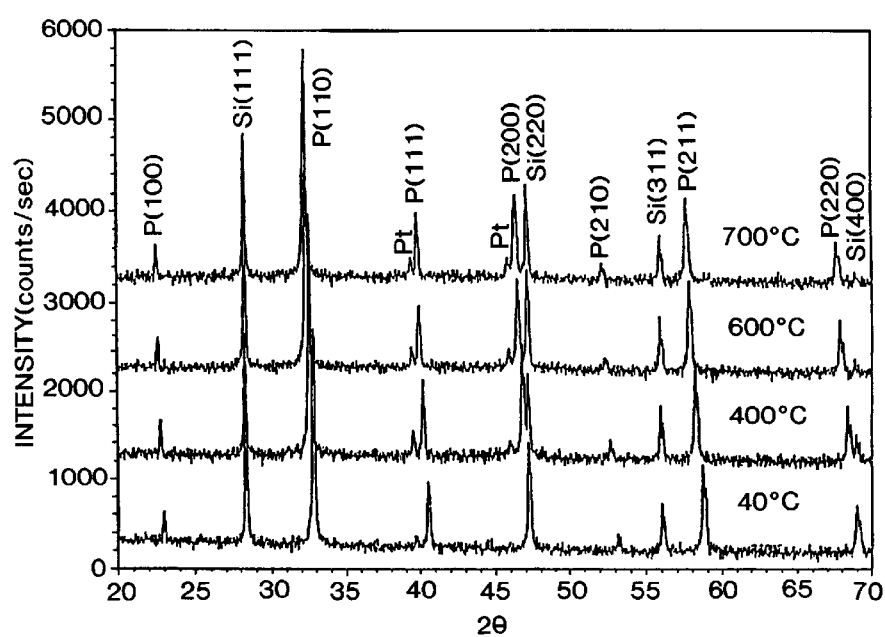
FIG. 2 is an X-ray diffraction pattern illustrating the cubic crystalline structure of the membrane element of the invention.

X-ray diffraction (XRD) analysis of a ceramic pellet formed in accordance with the first embodiment described above, was performed using a Scintag (manufactured by Scintag, Inc. of Cupertino, Calif.) diffractometer with a hot stage attachment to analyze phase development at various temperatures. As illustrated in FIG. 2, the specimen maintained a cubic structure without phase transformation at all temperatures between 40° C. and 700° C. The silicon and platinum peaks in FIG. 2 are from an internal standard and sample holder, respectively.

The oxygen permeation rate of the sample was measured using a sintered disc having a thickness of 1.0 mm sealed in an alumina test cell with a silver paste. Permeation testing was conducted as a function of temperature using as a feed gas 20%, by volume, of oxygen, in nitrogen. Introduction of the feed gas was preceded by a helium purge.

A Hewlett Packard 5890 gas chromatograph (manufactured by Hewlett Packard Company of Wilmington, Del.) and Servomex Series 1100 oxygen analyzer (manufactured by Servomex Ltd., Crowborough, Sussex, England) were used to analyze the gas compositions and calculate the oxygen fluxes. Table 3 records the oxygen flux as a function of temperature when an activation energy of about 1.0 electron volt was utilized.

TABLE 3

| Temperature in (° C.) | Oxygen Flux in Sccm/cm² |
|---|---|
| 600 | 0.2 |
| 700 | 0.4 |
| 800 | 0.8 |
| 900 | 1.5 |

Figure 3:
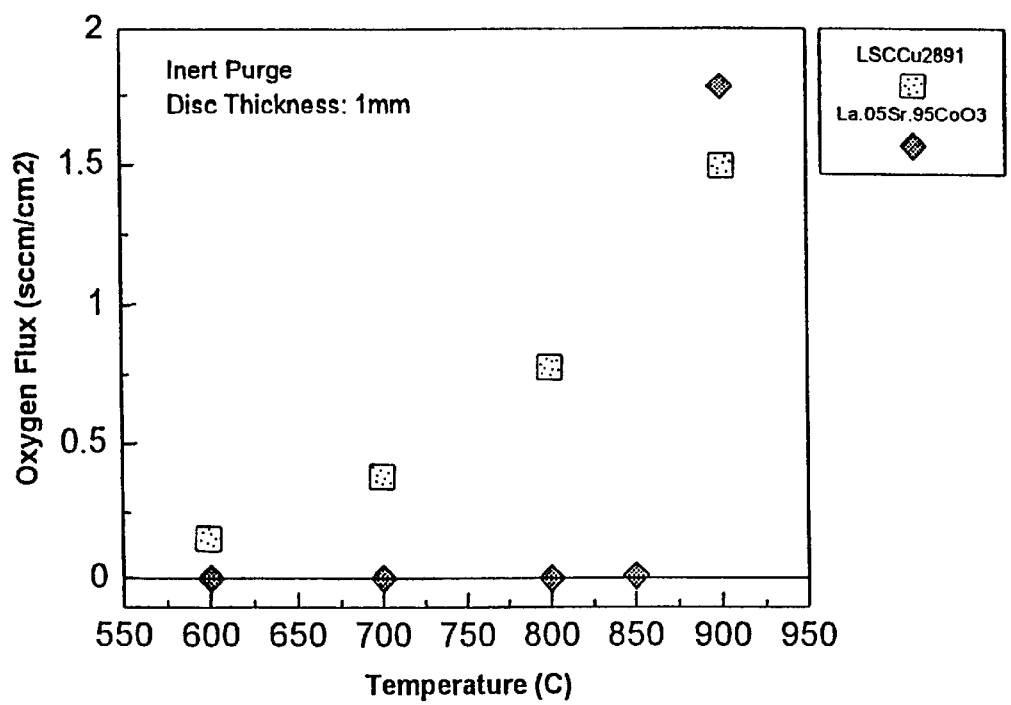
FIG. 3 graphically illustrates the oxygen flux as a function of temperature for a first membrane element of the invention.

FIG. 3 compares the oxygen flux recorded in Table 3 to a ceramic membrane structure known from the prior art ($La_{0.05}Sr_{0.95}CoO_3$). The prior art composition did not transport oxygen until heated to approximately 900° C. However, the composition of the invention had detectable oxygen transport at a temperature as low as 600° C. and a commercially useful oxygen flux at temperatures of between 700 and 800° C.

The ceramic structure was then allowed to cool to room temperature and cracking of the ceramic was detected.

Example 2

A one mm thick disc of the composition disclosed as the second embodiment above, was sealed in an alumina test cell with silver paste and permeation testing conducted as above. Table 4 records the detected oxygen flux.

TABLE 4

| Temperature in (° C.) | Oxygen Flux in Sccm/cm² |
|---|---|
| 600 | 0.1 |
| 700 | 0.3 |
| 800 | 0.7 |
| 900 | 1.1 |

Figure 4:
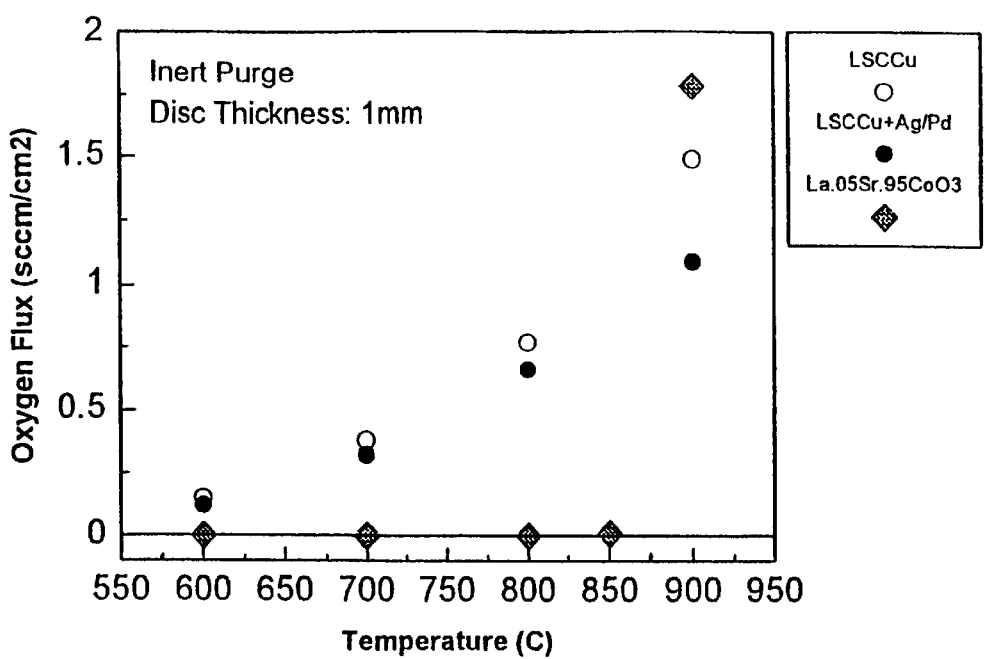
FIG. 4 graphically illustrates the oxygen flux as a function of temperature for a second membrane element of the invention.

FIG. 4 compares the oxygen flux achieved by the ceramic material formed in accordance with embodiment 2 with the respective oxygen flux of the ceramic material formed in accordance with embodiment 1 and the prior art ceramic material described above. While the addition of the metallic phase reduces the oxygen flux slightly, an oxygen flux is detected at temperatures as low as 600° C. and a commercially useful oxygen flux is achieved at temperatures as low as 800° C. Significantly, upon cooling, the sample remained intact without any cracking.

We claim:

1. A method of separating oxygen from an oxygen containing gas comprising permeating the oxygen within the oxygen containing gas through a ceramic membrane element at a temperature from 600° C. to 850° C., the ceramic membrane element consisting essentially of a substantially cubic perovskite structure that is substantially stable in air over a temperature range of 25° to 950° C., represented by the structure:

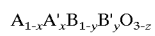
$$A_{1-x}A'_xB_{1-y}B'_yO_{3-z}$$

where

A is a lanthanide element;

A' is a suitable lanthanide element dopant;

B is selected from the group consisting of titanium, vanadium, chromium, manganese, iron, cobalt, nickel, zinc and mixtures thereof and wherein the iron content of said mixtures is less than 0.05 when cobalt is present in an amount greater than 0.1;

B' is copper;

x is between 0.4 and 0.8;

y is between 0.1 and 0.9; and z is>0 and determined from stoichiometry.

2. The method of claim 1, wherein said temperature is from 700° C. to 800° C.

3. The method of claim 1 wherein x is between 0.6 and 0.8, y is between 0.1 and 0.3 and z is between 0.1 and 0.5.

4. The method of claim 1 wherein A is lanthanum, A' is strontium and B is cobalt.

5. The method of claim 4 wherein x is between 0.6 and 0.8, y is between 0.1 and 0.3 and z is between 0.1 and 0.5.

6. The method of claim 1 further including C as represented by the structure:

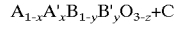
$$A_{1-x}A'_xB_{1-y}B'_yO_{3-z}+C$$

where

C is selected from the group consisting of silver, palladium, platinum, gold, rhodium, ruthenium, tungsten, tantalum, high temperature alloys, praseodymium-indium oxide mixture, niobium-titanium oxide mixture, nickel oxide, tungsten oxide, tantalum oxide, ceria, zirconia, magnesia, and mixtures thereof.

7. The method of claim 6 wherein C is selected from the group consisting of silver, silver/palladium alloys and high temperature alloys.

8. The method of claim 7 wherein C is an alloy of Ag and Pd and constitutes from 3% to 50% by weight of said composition.

9. The method of claim 8 wherein C is an alloy of Ag and Pd and constitutes from 3% to 20% by weight of said composition.

10. The method of claim 8 wherein C contains, by weight, from 10% to 95% palladium.

* * * * *